United States Patent
Singh

(10) Patent No.: US 7,632,339 B2
(45) Date of Patent: Dec. 15, 2009

(54) MOISTURE REMOVAL APPARATUS AND METHOD

(75) Inventor: Avnit Singh, Overland Park, KS (US)

(73) Assignee: General Electric Company, Schenectady, NY (US)

( * ) Notice: Subject to any disclaimer, the term of this patent is extended or adjusted under 35 U.S.C. 154(b) by 485 days.

(21) Appl. No.: 11/640,641

(22) Filed: Dec. 18, 2006

(65) Prior Publication Data
US 2008/0141636 A1 Jun. 19, 2008

(51) Int. Cl.
*B01D 46/00* (2006.01)

(52) U.S. Cl. .............................. 95/273; 55/482; 55/485; 55/428; 55/495; 55/497; 55/501; 55/511; 55/462; 55/465; 55/DIG. 17; 55/DIG. 18; 95/287; 96/108

(58) Field of Classification Search .................... 55/482, 55/485, 428, 495, 497, 501, 511, DIG. 17, 55/DIG. 18, 462, 465, 423, 466, DIG. 36; 95/273, 287; 96/108, 396
See application file for complete search history.

(56) References Cited

U.S. PATENT DOCUMENTS

| | | | | |
|---|---|---|---|---|
| 2,008,800 | A | * | 7/1935 | Somers ......................... 55/497 |
| 3,303,839 | A | * | 2/1967 | Tavan ...................... 126/299 D |
| 6,123,751 | A | | 9/2000 | Nelson et al. |
| 6,368,386 | B1 | * | 4/2002 | Nelson et al. .................. 95/268 |
| 6,802,690 | B2 | * | 10/2004 | Han et al. .................... 415/119 |
| 6,875,256 | B2 | | 4/2005 | Gillingham et al. |
| 2004/0226443 | A1 | * | 11/2004 | Gillingham et al. ........... 95/273 |
| 2005/0229780 | A1 | * | 10/2005 | Spink et al. ..................... 95/65 |
| 2006/0112825 | A1 | * | 6/2006 | Renwart et al. ............... 95/273 |
| 2007/0144121 | A1 | * | 6/2007 | Allan .......................... 55/444 |
| 2008/0105123 | A1 | * | 5/2008 | Devine ........................ 95/273 |

OTHER PUBLICATIONS

Donaldson Tech Topics GTS-508, Dec. 1, 2000.
Inlet Moisture Removal.
Filtrair Drop Safe (DS) Pocket Filters.

* cited by examiner

*Primary Examiner*—Jason M Greene
*Assistant Examiner*—Dung Bui
(74) *Attorney, Agent, or Firm*—Greg Strugalski; Ernest G. Cusick; Frank A. Landgraff

(57) ABSTRACT

A method of removing moisture from inlet air flowing to a gas turbine. The method comprises the steps of providing a housing for supporting a primary air filter. The housing is operably connected with the gas turbine. A hood connected with the housing is provided. The hood has a surface disposed at an acute angle relative to horizontal. Inlet air flow is directed into a preliminary filter supported above the hood and extending in a downward direction. The preliminary filter comprises media capable of separating moisture from the inlet air flowing through the preliminary filter at an exterior portion of the preliminary filter. Separated moisture agglomerates into a drop incapable of being carried by the flow of inlet air so the drop falls onto the hood to be directed out of the flow of inlet air.

20 Claims, 4 Drawing Sheets

MOISTURE REMOVAL APPARATUS AND METHOD

BACKGROUND OF THE INVENTION

The present invention relates generally to an air filter system. In particular, the present invention relates to structure and method for removing moisture from gas turbine inlet air.

Filter systems for gas turbine inlet air are known. One such known system includes a housing defining chamber. The chamber has an air inlet side and an air outlet side separated by an array of filters for removing particulates from the inlet air flow. Air enters the chamber through a plurality of vertically spaced inlet hoods positioned along the air inlet side. The inlet hoods are configured such that air entering the inlet hoods is first directed in an upward direction and then deflected by deflector plates in a downward direction. Air flow contact with the deflector plates causes some particulate material and moisture from the moving air to separate from the air flow and settle or accumulate on the inlet hoods or in the bottom of the chamber.

Another known gas turbine air filter system is similar to that described above. It further includes a mist eliminator located in each hood. A pleated element is positioned on top of the mist eliminator. Relatively large drops of moisture in the inlet air stream is removed by inertial separation in the mist eliminator. Smaller droplets of moisture are removed by the pleated media. The removed moisture droplets fall onto hoods below and onto the ground.

Such known gas turbine filter systems may be rather large. That is, they occupy a relatively large "footprint" adjacent to the gas turbine which may be undesirable in some applications. Such known filter systems may also not be as effective as desired and have other disadvantages, for example leakage around mounting structure. Accordingly, there is a need for improvements to gas turbine inlet filter systems.

BRIEF DESCRIPTION OF THE INVENTION

The invention offers an improved moisture removal for filter systems. The improvements include a relatively smaller housing package, consistent moisture removal over time by a filter with simple and reliable mounting structure.

One aspect of the invention is a moisture removal structure for a filtration system. The structure includes a housing. A hood is attached to the housing. The hood has a surface disposed at an acute angle relative to horizontal. A preliminary filter is supported above the hood and extends in a downward direction. The preliminary filter comprises media capable of separating moisture from the air flowing through the preliminary filter at an exterior portion of the preliminary filter. Separated moisture agglomerates into a drop incapable of being carried by the flow of air so the drop falls onto the hood and directed away from the flow of air.

Another aspect of the invention is a moisture removal system for a gas turbine. The moisture removal system comprises a housing for supporting a primary air filter. The housing is operably connected with a gas turbine. A hood is attached to the housing. The hood has a surface disposed at an acute angle relative to horizontal. A preliminary filter is supported above the hood and extends in a downward direction. The preliminary filter comprises media capable of separating moisture from the air flowing through the preliminary filter at an exterior portion of the preliminary filter. Separated moisture agglomerates into a drop incapable of being carried by the flow of inlet air so the drop falls onto the hood and directed out of the flow of inlet air.

Another aspect of the invention is a method of removing moisture from inlet air flowing to a gas turbine. The method comprises the steps of providing a housing for supporting a primary air filter. The housing is operably connected with a gas turbine. A hood connected with the housing is provided. The hood has a surface disposed at an acute angle relative to horizontal. Inlet air flow is directed into a preliminary filter supported above the hood and extending in a downward direction. The preliminary filter comprises media capable of separating moisture from the inlet air flowing through the preliminary filter at an exterior portion of the preliminary filter. Separated moisture agglomerates into a drop incapable of being carried by the flow of inlet air so the drop falls onto the hood to be directed out of the flow of inlet air.

BRIEF DESCRIPTION OF THE DRAWINGS

Further features of the invention will become apparent to those skilled in the art to which the invention relates from reading the following description with reference to the accompanying drawings, in which.

DETAILED DESCRIPTION OF THE INVENTION

Figure 1:
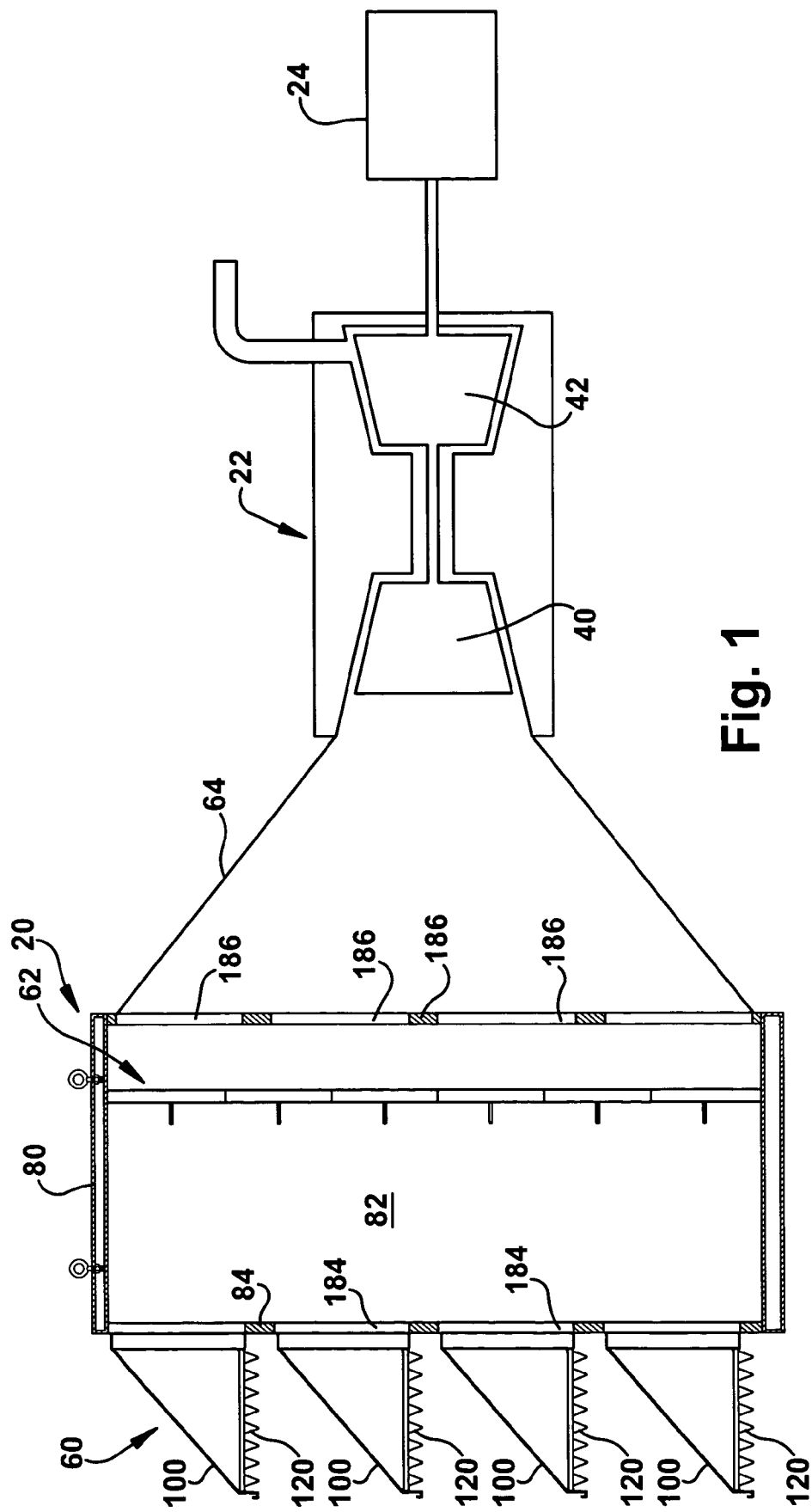
FIG. 1 is a schematic view, partly in section, of a moisture removal system, constructed according to one aspect of the invention for a gas turbine air inlet.

A filter system 20 constructed according to one aspect of the invention for filtering inlet air of a gas turbine 22 is illustrated in FIG. 1. The gas turbine 22 can be used for any desired purpose, such as powering an electrical generator 24. The gas turbine 22 uses a relatively large quantity of air that is directed to a compressor portion 40, gets ignited and where expanding gases ultimately drive a turbine portion 42. The large quantity of inlet air must be filtered of particulates, salt and moisture in order to prevent damage and accelerated wear to components of the gas turbine 22.

Various aspects of the invention are described with respect to an inlet system for a gas turbine 22. It will be appreciated that the aspects of the invention are also applicable to a variety of other applications that are prone to damage by moisture and particulates. For example, the various aspects of the present invention are applicable to applications such as internal combustion engine intake systems, clean room intake systems, heating ventilating and air conditioning (HVAC) systems, hospital HVAC systems and air compressor intake systems.

Moisture contamination is particularly problematic in environments having relatively high humidity, such as in marine or off-shore applications, or in conditions such as rain, mist or fog. If the air passing into an air filtration system is relatively humid it then migrates through the filter media. This type of moisture migration can cause substantial problems with gas turbine operations and is a particular problem addressed by at least one aspect of the invention. It is well known that light rain, mist and fog create very small moisture droplets that are easily carried in a fast moving stream of air, such as inlet air for a gas turbine 22. This is the main type of moisture that is addressed by this aspect of the invention. Generally, heavy rain has drops that are too large to be easily carried in a flow of air.

According to one aspect of the invention, improved moisture removal is provided for the air inlet filter system 20. The filter system 20 (FIG. 2) includes a first preliminary stage or moisture removal system 60 and a second stage or primary filter 62 positioned downstream from the preliminary filter structure. Ducting 64 directs filtered air from the filter system 20 to the gas turbine 22.

The filter system 20 includes a housing 80 defining a chamber 82. The chamber 82 has an inlet side 84 and an outlet side 86. The housing 80 is constructed of any suitable material, such as metal framing and sheet. The housing 80 can be constructed to have a relatively small footprint. This results because the chamber 82 does not have to provide for collection areas for moisture separated from the air flow since the majority of the moisture removal is accomplished outside the housing 80.

Inlet air enters the chamber 82 through the moisture removal system 60. The housing 80 supports the primary air filter 62. The primary filter 62 functions mainly to remove particulates from the inlet air that could be harmful to the gas turbine 22. The primary filter 62 can be of any suitable construction, but is illustrated as an array of panel filters. The panel filters are made from any suitable material selected for the application they are used in. It will be appreciated that any suitable filter construction may be used as the primary filter 62, such as without limitation cartridges or bags.

Figure 3:
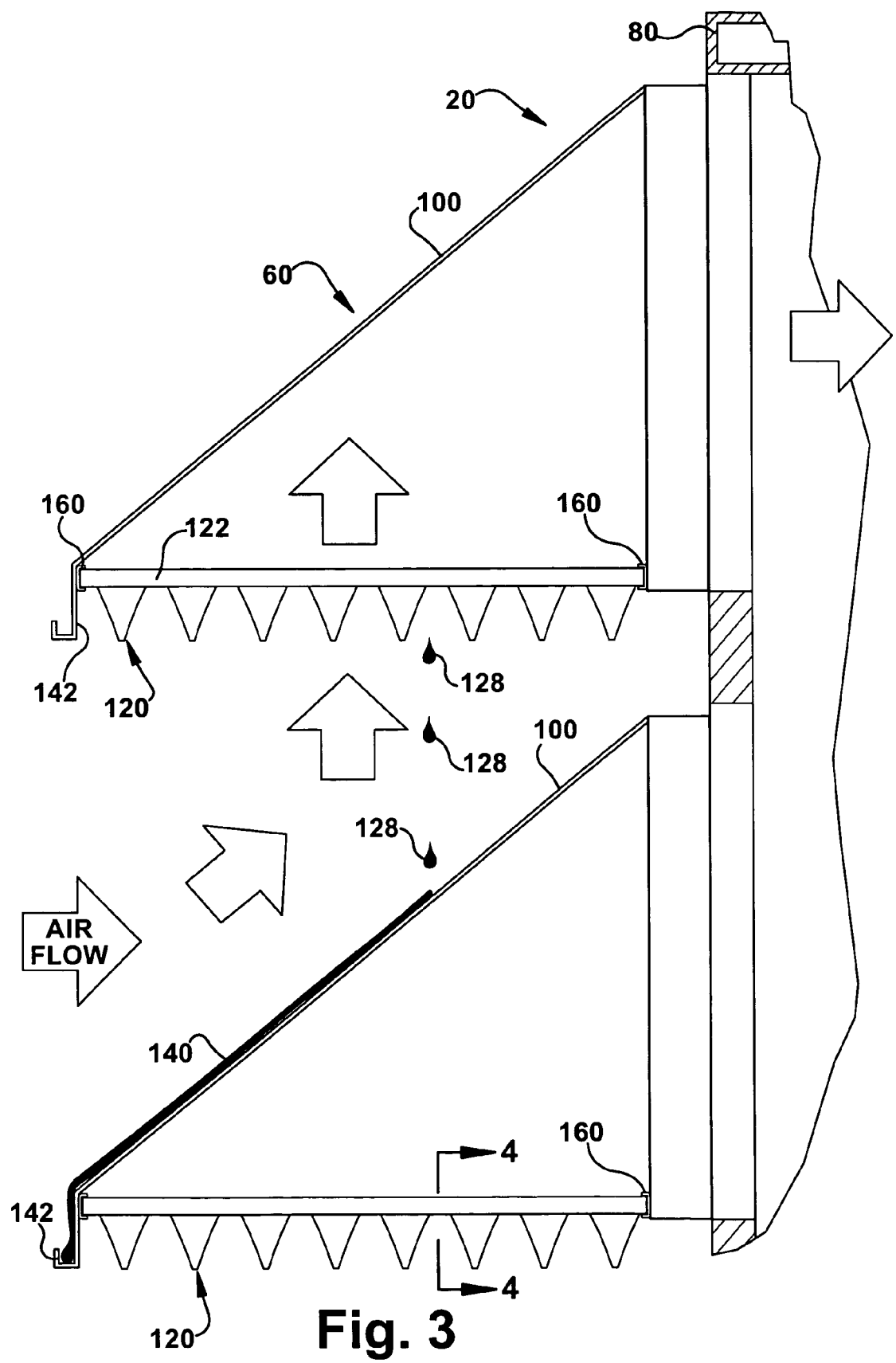
FIG. 3 is a enlarged view of a portion of the housing of the moisture removal system illustrated in 2.

The moisture removal system 60 includes a plurality of vertically spaced inlet hoods 100 positioned along the inlet side 84 of the chamber. The hoods 100 are attached to the housing 80. Each of the hoods 100 has a surface disposed at an acute angle relative to horizontal. This orientation forces the air flow to move initially in an upward direction, as illustrated in FIG. 3. The orientation of the hood 100 also serves to keep relatively large moisture drops, as encountered in heavy rain or snow, from the inlet air flow, as viewed in FIG. 3.

Figure 2:
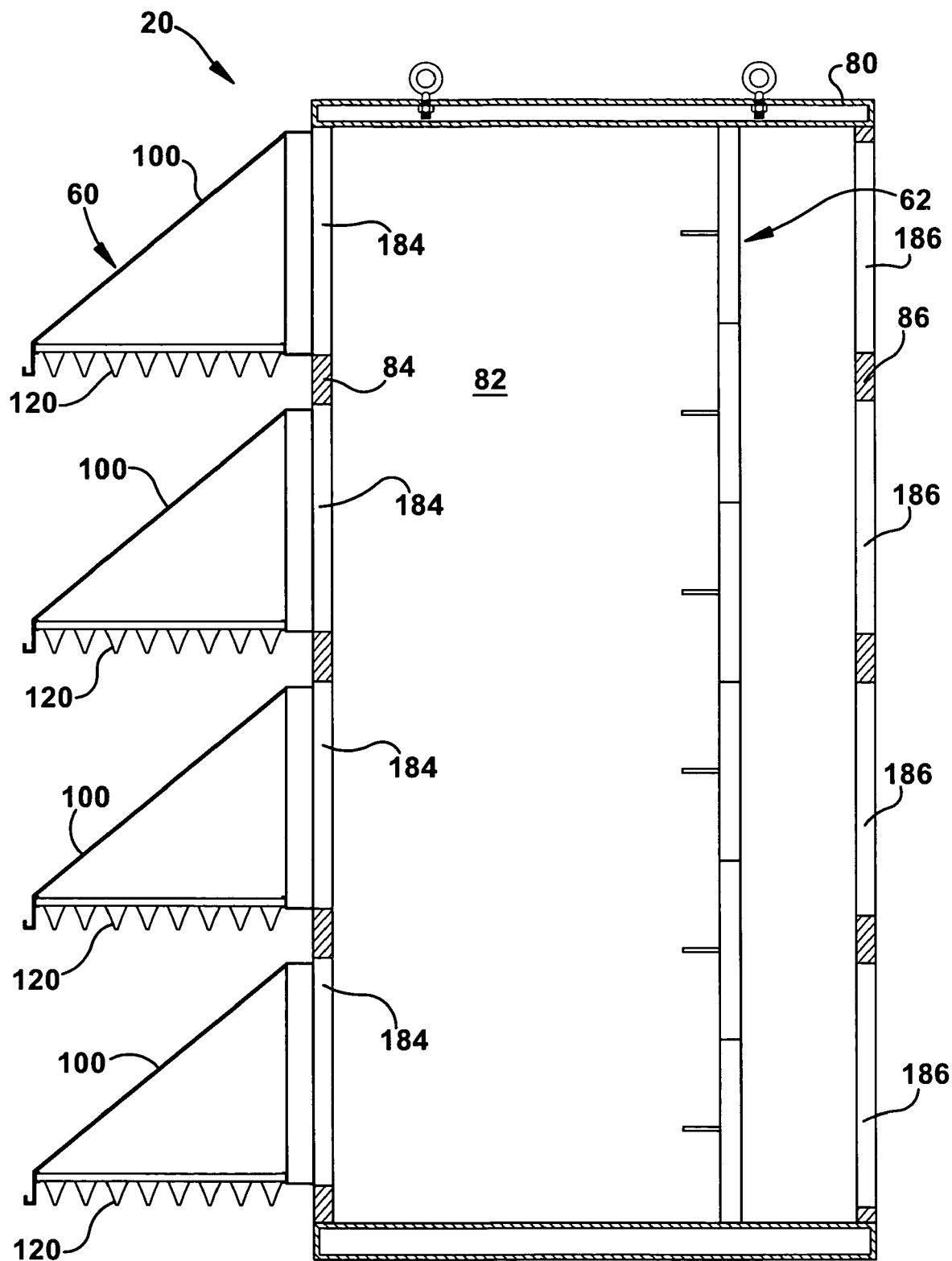
FIG. 2 is an enlarged view of a housing of the moisture removal system illustrated in FIG. 1.
Figure 5:
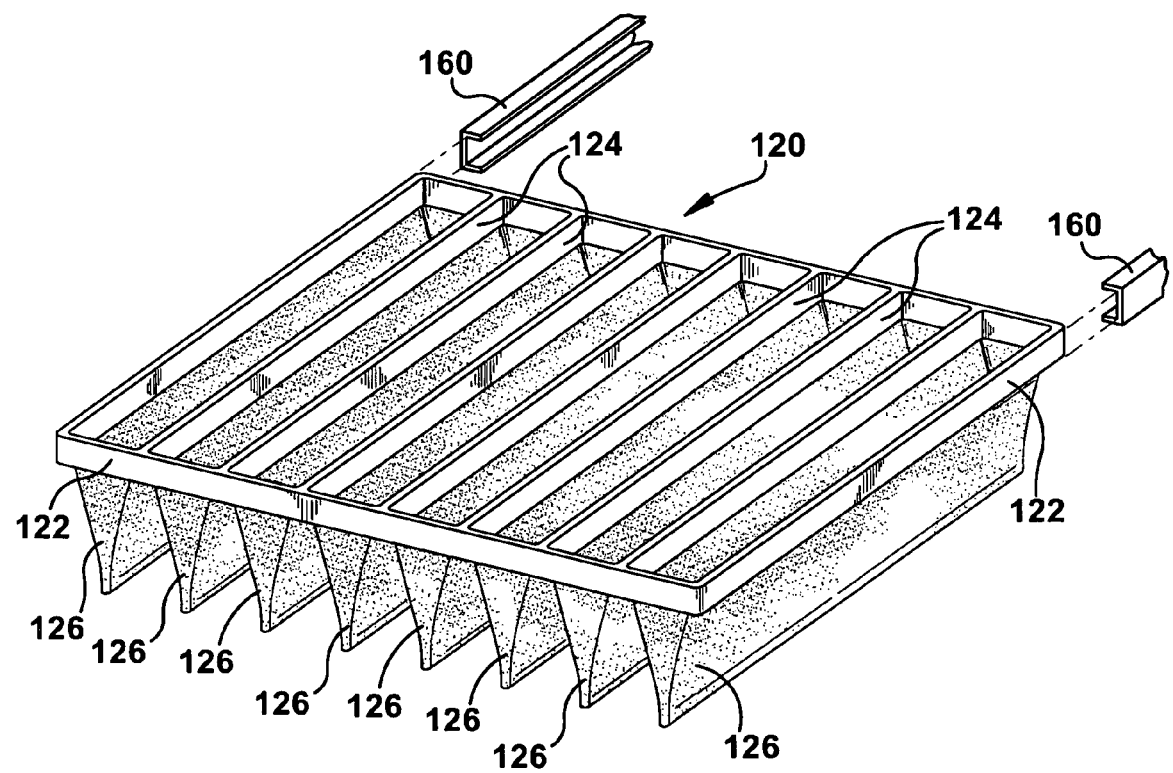
FIG. 5 is a perspective view of a filter assembly illustrated in FIG. 4.

Preliminary filters 120 are supported above each of the hoods 100, except the uppermost hood as viewed in FIGS. 1-3. The preliminary filters 120 extend in a substantially downward direction. Each preliminary filter 120 (FIG. 5) includes a relatively rigid plastic frame 122 that extends around the periphery of the preliminary filter and internal support and reinforcing ribs 124. Bags or "pocket filters" 126 are supported by the frame 122 and ribs 124. It will be appreciated that any suitable filter construction may be used for the preliminary filter 120, such as without limitation bags or cartridges. It will also be appreciated that any suitable frame material may be used, such as without limitation stainless steel.

It will further be appreciated that the orientation of the pocket filters 126 may be different than that shown for illustration purposes in FIGS. 1-5. For example, the apex of the pocket filter 126 may be oriented parallel to the direction of inlet air flow in order to minimize the chance of the pocket filter deforming, folding or collapsing under the force of inlet air movement. It is contemplated that the sides of the pocket filters 126 may have to be connected together, such as by sewing, at appropriate locations. This connection is to maximize the aerodynamic efficiency of the pockets within a particular pocket filter 126 configuration and to minimize contact between adjacent pockets that would inhibit air flow.

Each pocket filter 126 is made from suitable filter media with hydrophobic properties. One such filter media is a single layer of 100% polypropylene fiber material. It will be appreciated that other suitable materials may be used, such as a mixture of polypropylene and polyester fibers, and thermally bonded polypropylene or polyester bi-component fibers (and mixtures thereof). The media may be non-woven, air laid, carded or needle punched. The media preferably has an average thickness in the range of about 4 mm (0.157 inch) to 18 mm (0.709 inch). The media may have a graded density to improve filter life. If the fiber material is not inherently hydrophobic, the fibers are coated to provide hydrophobic properties to the media.

The pocket filters 126 of the preliminary filter 120 are made from filter media capable of separating moisture droplets from the air flowing through the preliminary filter. The separated moisture droplets collect on an exterior surface of the bags 126 if the preliminary filter 120. Separated moisture droplets agglomerate into a relatively larger drop 128 (FIG. 3). The drop 128 has a size and mass that's incapable of being carried by the flow of inlet air. The drop 128 falls onto the hood 100 below and is directed out of the flow of inlet air by creating a stream 140 or sheet of water that runs down the hood 100.

The stream 140 runs to the lowermost edge of the hood 100. The stream 140 is collected in a conduit 142 attached to the hood 100. The conduit 142 conducts the collected water in a direction laterally away from the direction of flow of the inlet air.

Figure 4:
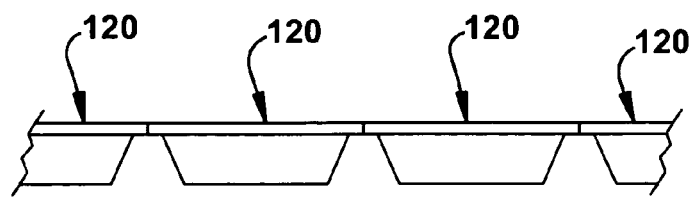
FIG. 4 is view of a preliminary filter array of the housing of the moisture removal system.

Several preliminary filters 120 (FIG. 4) are mounted in the underside of the hoods 100. The preliminary filters 120 are slid into mounting channels 160. The mounting channels 160 are closely sized to fit the frames 122 of the preliminary filters 120 to provide a good seal to inhibit leakage through the interface. Adjacent preliminary filters 120 may engage one another when installed in a row, as illustrated in FIG. 4, or be in separate mounting channels. The preliminary filters 120 may also be installed in more than a single row, for example in an array or matrix of multiple rows and columns.

In general, during filtering, inlet air flow is directed to the preliminary air filters 120. Moisture is separated from the inlet air flow at the exterior of the preliminary filters 120. The moisture-free inlet air flows into the interior of the hoods 100 and then into the chamber 82 through inlet openings 184 in the inlet side 84. The air flows from the chamber 82 and through the primary filters 62 to remove particulates. Air the flows out of the filter system through openings 186 in the outlet side 86 of the housing 80 and into the ducting 64 to the gas turbine 22.

The primary filters 62 preferably have relatively high filtering efficiencies with respect to particulate material. The primary filters 62 may be of any suitable construction and made from any suitable media. For example, primary filters 62 having filtration efficiencies in the range of 65-75%, or greater than 65% may be used.

It will be appreciated that a variety of filtering configurations and materials for one or both of the filters can be used to reduce the concentration or level of moisture and salt if present, in an air stream. By way of non-limiting example, illustrative hydrophobic/moisture filtering materials or fibers include polytetrafluoroethylene, polypropylene, polyethylene, polyvinyl chloride, polysulfone, polystyrene and expanded polytetrafluoroethylene (ePTFE) membrane. Materials and fibers can also be made hydrophobic through the use of surface treatments. Illustrative surface treatments include fluorocarbons and silicones. Of course, the particular hydrophobic materials listed herein are strictly examples, and other materials can also be used in accordance with the principles of the present invention.

From the above description of at least one aspect of the invention, those skilled in the art will perceive improvements, changes and modifications. Such improvements, changes and modifications within the skill of the art are intended to be covered by the appended claims.

The invention claimed is:

1. A moisture removal system for a gas turbine, the system comprising:
  a housing for supporting a primary air filter, the housing operably connected with a gas turbine;
  a hood attached to the housing, the hood having a surface disposed at an acute angle relative to horizontal; and
  a preliminary filter supported above the hood and extending in a downward direction, the preliminary filter comprising media capable of separating moisture from the air flowing through the preliminary filter at an exterior surface of the preliminary filter;
  whereby separated moisture agglomerates into a drop incapable of being carried by the flow of inlet air so the drop falls onto the hood to be directed out of the flow of inlet air.

2. The moisture removal system of claim 1 further including a conduit to conduct water away from the flow of inlet air.

3. The moisture removal system of claim 1 wherein the preliminary filter is in the form of at least one pocket filter extending in a substantially vertical direction.

4. The moisture removal system of claim 1 wherein the preliminary filter includes a frame that is receivable in a channel connected with the housing.

5. The moisture removal system of claim 4 wherein the frame of the preliminary filter extends around the mounting periphery of a pocket filter structure formed from the media.

6. The moisture removal system of claim 1 wherein the media of the preliminary filter is made from a hydrophobic material.

7. The moisture removal system of claim 1 wherein the preliminary filter is mounted in a second hood.

8. A method of removing moisture from inlet air flowing to a gas turbine, the method comprising the steps of:
  providing a housing for supporting a primary air filter, the housing being operably connected with a gas turbine;
  providing a hood connected with the housing, the hood having a surface disposed at an acute angle relative to horizontal;
  directing inlet air flow into a preliminary filter supported above the hood and extending in a downward direction, the preliminary filter comprising media capable of separating moisture from the inlet air flowing through the preliminary filter at an exterior surface of the preliminary filter; and
  agglomerating separated moisture into a drop incapable of being carried by the flow of inlet air so the drop falls onto the hood to be directed out of the flow of inlet air.

9. The method of claim 8 further including the step of conducting water away from the flow of inlet air in a conduit.

10. The method of claim 8 wherein the directing step includes providing a preliminary filter that is in the form of a pocket filter extending in a substantially vertical direction.

11. The method of claim 8 wherein the directing step includes providing the preliminary filter with a frame that is receivable in a channel connected with the housing.

12. The method of claim 11 wherein the directing step further includes providing the frame of the preliminary filter extending around a mounting periphery of a pocket filter structure formed from the media.

13. Moisture removal structure for a filtration system, the structure comprising:
  a housing;
  a hood attached to the housing, the hood having a surface disposed at an acute angle relative to horizontal; and
  a preliminary filter supported above the hood and extending in a downward direction, the preliminary filter comprising media capable of separating moisture from the air flowing through the preliminary filter at an exterior surface of the preliminary filter;
  whereby separated moisture agglomerates into a drop incapable of being carried by the flow of air so the drop falls onto the hood to be directed out of the flow of air.

14. The moisture removal structure of claim 13 further including a conduit to conduct water away from the flow of inlet air.

15. The moisture removal structure of claim 13 wherein the preliminary filter is in the form of at least one pocket filter extending in a substantially vertical direction.

16. The moisture removal structure of claim 13 wherein the preliminary filter includes a frame that is receivable in a channel connected with the housing.

17. The moisture removal structure of claim 16 wherein the frame of the preliminary filter extends around the mounting periphery of a pocket filter structure formed from the media.

18. The moisture removal structure of claim 13 wherein the media of the preliminary filter is made from a hydrophobic material.

19. The moisture removal structure of claim 13 wherein the preliminary filter is mounted in a second hood.

20. The moisture removal structure of claim 13 further including a primary filter supported by the housing to separate particulates from the flow of air.

* * * * *